United States Patent
Bass et al.

(10) Patent No.: US 7,166,258 B2
(45) Date of Patent: Jan. 23, 2007

(54) AUTOMATION-OPTIMIZED MICROARRAY PACKAGE

(75) Inventors: Jay K. Bass, Mountain View, CA (US); John F. McEntee, Boulder Creek, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 709 days.

(21) Appl. No.: 10/287,338

(22) Filed: Nov. 4, 2002

(65) Prior Publication Data

US 2003/0068253 A1    Apr. 10, 2003

Related U.S. Application Data

(63) Continuation-in-part of application No. 09/775,375, filed on Jan. 31, 2001.

(51) Int. Cl.
*B01L 3/00*    (2006.01)
(52) U.S. Cl. .................................... 422/102; 422/104
(58) Field of Classification Search ................ 422/102, 422/104
See application file for complete search history.

(56) References Cited

U.S. PATENT DOCUMENTS

| | | | |
|---|---|---|---|
| 5,599,695 A | 2/1997 | Pease et al. | |
| 5,753,788 A | 5/1998 | Fodor et al. | |
| 6,089,861 A * | 7/2000 | Kelly et al. | 433/9 |
| 6,171,797 B1 | 1/2001 | Perbost | |
| 6,180,351 B1 | 1/2001 | Cattell | |
| 6,232,072 B1 | 5/2001 | Fisher | |
| 6,242,266 B1 | 6/2001 | Schleifer et al. | |
| 6,323,043 B1 | 11/2001 | Caren et al. | |
| 6,329,143 B1 | 12/2001 | Stryer et al. | |
| 6,589,778 B1 * | 7/2003 | Hawkins | 435/287.2 |

* cited by examiner

*Primary Examiner*—Jill Warden
*Assistant Examiner*—Natalia Levkovich

(57) ABSTRACT

A method and system for economically packaging microarrays into sealed reaction chambers and storage vessels. A pocket strip is manufactured as a linear sequence of pockets, or wells, into which microarrays are positioned. A cover strip is then heat sealed to the upper surface of the pocket strip to create a linear sequence of sealed reaction chambers or storage vessels, each containing a microarray. Mechanical features or optical features are included along the length of the pocket strip to facilitate mechanical translation and positioning of microarrays embedded within the microarray strip. Septa are affixed to, or embedded within, the cover strip to provide resealable ports through which solutions can be introduced into, or extracted from, the reaction chambers. In an alternate embodiment, the microarrays are deposited directly onto the cover strip, eliminating the need for separate microarray substrates.

32 Claims, 5 Drawing Sheets

ID-OPTIMIZED MICROARRAY
PACKAGE

CROSS-REFERENCE TO RELATED
APPLICATION

This application is a continuation-in-part of U.S. application Ser. No. 09/775,375, filed Jan. 31, 2001, now pending.

TECHNICAL FIELD

The present invention relates to microarrays, also called molecular arrays and biochips, and relates, in particular, to a method and system for packaging microarrays economically, securely, efficiently, and in a way that facilitates automated processing and scanning.

BACKGROUND OF THE INVENTION

Microarrays are widely used and increasingly important tools for rapid hybridization analysis of sample solutions against hundreds or thousands of precisely ordered and positioned features on the active surfaces of microarrays that contain different types of molecules. Microarrays are normally prepared by synthesizing or attaching a large number of molecular species to a chemically prepared substrate such as silicone, glass, or plastic. Each feature, or element, on the active surface of the microarray is defined to be a small, regularly-shaped region on the surface of the substrate. The features are arranged in a regular pattern. Each feature may contain a different molecular species, and the molecular species within a given feature may differ from the molecular species within the remaining features of the microarray. In one type of hybridization experiment, a sample solution containing radioactively, fluorescently, or chemiluminescently labeled molecules is applied to the active surface of the microarray. Certain of the labeled molecules in the sample solution may specifically bind to, or hybridize with, one or more of the different molecular species in one or more features of the microarray. Following hybridization, the sample solution is removed by washing the surface of the microarray with a buffer solution, and the microarray is then analyzed by radiometric or optical methods to determine to which specific features of the microarray the labeled molecules are bound. Thus, in a single experiment, a solution of labeled molecules can be screened for binding to hundreds or thousands of different molecular species that together compose the microarray. Microarrays commonly contain oligonucleotides or complementary deoxyribonucleic molecules to which labeled deoxyribonucleic acid and ribonucleic acid molecules bind via sequence-specific hybridization.

Generally, radiometric or optical analysis of the microarray produces a scanned image consisting of a two-dimensional matrix, or grid, of pixels, each pixel having one or more intensity values corresponding to one or more signals. Scanned images are commonly produced electronically by optical or radiometric scanners and the resulting two-dimensional matrix of pixels is stored in computer memory or on a non-volatile storage device. Alternatively, analog methods of analysis, such as photography, can be used to produce continuous images of a microarray that can be then digitized by a scanning device and stored in computer memory or in a computer storage device.

Microarrays are often prepared on 1-inch by 3-inch glass substrates, not coincidentally having dimensions of common glass microscope slides. Commercial microarrays are often prepared on smaller substrates that are embedded in plastic housings. FIG. 1 shows a common, currently available commercial microarray packaged within a plastic housing. The microarray substrate 101 is embedded within the large, rather bulky plastic housing 102 to form an upper transparent cover over an aperture 103 within the plastic housing 102. The features that together compose the microarray are arranged on the inner, or downward, surface of the substrate 101, and are thus exposed to a chamber within the plastic housing 102 comprising the microarray substrate 101 and the sides of the aperture 104–107. A transparent bottom cover may be embedded in the lower surface of the plastic housing to seal the chamber in order to create a small reaction vessel into which sample solutions may be introduced for hybridization with molecular species bound to the substrate of the microarray. Thus, the plastic housing serves to package the microarray and protect the microarray from contamination and mechanical damage during handling and storage, and may also serve as a reaction chamber in which sample solutions are introduced for hybridization with features of the microarray. The plastic housing may further serve as a support for the microarray during optical or radiometric scanning of the microarray following exposure of the microarray to sample solutions. Scanning may, in certain cases, be carried out through the substrate of the microarray without a need to remove the microarray from the plastic housing.

The ability to denature and renature double-stranded deoxyribonucleic acid ("DNA") and ribonucleic acid ("RNA") has led to the development of many extremely powerful and discriminating assay technologies for identifying the presence of DNA and RNA polymers having particular base sequences or containing particular base subsequences within complex mixtures of different nucleic acid polymers, other biopolymers, and inorganic and organic chemical compounds. One such methodology is the array-based hybridization assay. An array comprises a substrate upon which a regular pattern of features is prepared by various manufacturing processes. Each feature of the array contains a large number of identical oligonucleotides covalently bound to the surface of the feature. These bound oligonucleotides are known as probes. In general, chemically distinct probes are bound to the different features of an array, so that each feature corresponds to a particular nucleotide sequence.

Once an array has been prepared, the array may be exposed to a sample solution of target DNA or RNA molecules labeled with fluorophores, chemiluminescent compounds, or radioactive atoms. Labeled target DNA or RNA hybridizes through base pairing interactions to the complementary probe DNA, synthesized on the surface of the array. Targets that do not contains nucleotide sequences complementary to any of the probes bound to array surface do not hybridize to generate stable duplexes and, as a result, tend to remain in solution. The sample solution is then rinsed from the surface of the array, washing away any unbound-labeled DNA molecules. In other embodiments, unlabeled target sample is allowed to hybridize with the array first. Typically, such a target sample has been modified with a chemical moiety that will react with a second chemical moiety in subsequent steps. Then, either before or after a wash step, a solution containing the second chemical moiety bound to a label is reacted with the target on the array. After washing, the array is ready for scanning. Biotin and avidin represent an example of a pair of chemical moieties that can be utilized for such steps.

Finally, the bound labeled DNA molecules are detected via optical or radiometric scanning. Optical scanning involves exciting labels of bound labeled DNA molecules with electromagnetic radiation of appropriate frequency and detecting fluorescent emissions from the labels, or detecting light emitted from chemiluminescent labels. When radioisotope labels are employed, radiometric scanning can be used to detect the signal emitted from the hybridized features. Additional types of signals are also possible, including electrical signals generated by electrical properties of bound target molecules, magnetic properties of bound target molecules, and other such physical properties of bound target molecules that can produce a detectable signal. Optical, radiometric, or other types of scanning produce an analog or digital representation of the array, with features to which labeled target molecules are hybridized optically or digitally differentiated from those features to which no labeled DNA molecules are bound. In other words, the analog or digital representation of a scanned array displays positive signals for features to which labeled DNA molecules are hybridized and displays negative features to which no, or an undetectably small number of, labeled DNA molecules are bound. Features displaying positive signals in the analog or digital representation indicate the presence of DNA molecules with complementary nucleotide sequences in the original sample solution. Moreover, the signal intensity produced by a feature is generally related to the amount of labeled DNA bound to the feature, in turn related to the concentration, in the sample to which the array was exposed, of labeled DNA complementary to the oligonucleotide within the feature.

One, two, or more than two data subsets within a data set can be obtained from a single molecular array by scanning the molecular array for one, two or more than two types of signals. Two or more data subsets can also be obtained by combining data from two different arrays. When optical scanning is used to detect fluorescent or chemiluminescent emission from chromophore labels, a first set of signals, or data subset, may be generated by scanning the molecular array at a first optical wavelength, a second set of signals, or data subset, may be generated by scanning the molecular array at a second optical wavelength, and additional sets of signals may be generated by scanning the molecular at additional optical wavelengths. Different signals may be obtained from a molecular array by radiometric scanning to detect radioactive emissions one, two, or more than two different energy levels. Target molecules may be labeled with either a first chromophore that emits light at a first wavelength, or a second chromophore that emits light at a second wavelength. Following hybridization, the molecular array can be scanned at the first wavelength to detect target molecules, labeled with the first chromophore, hybridized to features of the molecular array, and can then be scanned at the second wavelength to detect target molecules, labeled with the second chromophore, hybridized to the features of the molecular array. In one common molecular array system, the first chromophore emits light at a red visible-light wavelength, and the second chromophore emits light at a green, visible-light wavelength. The data set obtained from scanning the molecular array at the red wavelength is referred to as the "red signal," and the data set obtained from scanning the molecular array at the green wavelength is referred to as the "green signal." While it is common to use one or two different chromophores, it is possible to use one, three, four, or more than four different chromophores and to scan a molecular array at one, three, four, or more than four wavelengths to produce one, three, four, or more than four data sets.

An array may include any one-, two- or three-dimensional arrangement of addressable regions, or features, each bearing a particular chemical moiety or moieties, such as biopolymers, associated with that region. Any given array substrate may carry one, two, or four or more arrays disposed on a front surface of the substrate. Depending upon the use, any or all of the arrays may be the same or different from one another and each may contain multiple spots or features. A typical array may contain more than ten, more than one hundred, more than one thousand, more ten thousand features, or even more than one hundred thousand features, in an area of less than 20 $cm^2$ or even less than 10 $cm^2$. For example, square features may have widths, or round feature may have diameters, in the range from a 10 μm to 1.0 cm. In other embodiments each feature may have a width or diameter in the range of 1.0 μm to 1.0 mm, usually 5.0 μm to 500 μm, and more usually 10 μm to 200 μm. Features other than round or square may have area ranges equivalent to that of circular features with the foregoing diameter ranges. At least some, or all, of the features may be of different compositions (for example, when any repeats of each feature composition are excluded the remaining features may account for at least 5%, 10%, or 20% of the total number of features). Interfeature areas are typically, but not necessarily, present. Interfeature areas generally do not carry probe molecules. Such interfeature areas typically are present where the arrays are formed by processes involving drop deposition of reagents, but may not be present when, for example, photolithographic array fabrication processes are used. When present, interfeature areas can be of various sizes and configurations.

Each array may cover an area of less than 100 $cm^2$, or even less than 50 $cm^2$, 10 $cm^2$ or 1 $cm^2$. In many embodiments, the substrate carrying the one or more arrays will be shaped generally as a rectangular solid having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. Other shapes are possible, as well. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, a substrate may transmit at least 20%, or 50% (or even at least 70%, 90%, or 95%), of the illuminating light incident on the front as may be measured across the entire integrated spectrum of such illuminating light or alternatively at 532 nm or 633 nm.

Arrays can be fabricated using drop deposition from pulsejets of either polynucleotide precursor units (such as monomers) in the case of in situ fabrication, or the previously obtained polynucleotide. Such methods are described in detail in, for example, U.S. Pat. Nos. 6,242,266, U.S. 6,232,072, U.S. 6,180,351, U.S. 6,171,797, U.S. 6,323,043, U.S. patent application Ser. No. 09/302,898 filed Apr. 30, 1999 by Caren et al., and the references cited therein. Other drop deposition methods can be used for fabrication, as previously described herein. Also, instead of drop deposition methods, photolithographic array fabrication methods may be used such as described in U.S. Pat. Nos. 5,599,695, U.S. 5,753,788, and U.S. 6,329,143. Interfeature areas need not be present particularly when the arrays are made by photolithographic methods as described in those patents.

As pointed out above, array-based assays can involve other types of biopolymers, synthetic polymers, and other types of chemical entities. A biopolymer is a polymer of one or more types of repeating units. Biopolymers are typically found in biological systems and particularly include polysaccharides, peptides, and polynucleotides, as well as their analogs such as those compounds composed of, or containing, amino acid analogs or non-amino-acid groups, or nucleotide analogs or non-nucleotide groups. This includes polynucleotides in which the conventional backbone has been replaced with a non-naturally occurring or synthetic backbone, and nucleic acids, or synthetic or naturally occurring nucleic-acid analogs, in which one or more of the conventional bases has been replaced with a natural or synthetic group capable of participating in Watson-Crick-type hydrogen bonding interactions. Polynucleotides include single or multiple-stranded configurations, where one or more of the strands may or may not be completely aligned with another. For example, a biopolymer includes DNA, RNA, oligonucleotides, and PNA and other polynucleotides as described in U.S. Pat. No. 5,948,902 and references cited therein, regardless of the source. An oligonucleotide is a nucleotide multimer of about 10 to 100 nucleotides in length, while a polynucleotide includes a nucleotide multimer having any number of nucleotides.

As an example of a non-nucleic-acid-based molecular array, protein antibodies may be attached to features of the array that would bind to soluble labeled antigens in a sample solution. Many other types of chemical assays may be facilitated by array technologies. For example, polysaccharides, glycoproteins, synthetic copolymers, including block copolymers, biopolymer-like polymers with synthetic or derivitized monomers or monomer linkages, and many other types of chemical or biochemical entities may serve as probe and target molecules for array-based analysis. A fundamental principle upon which arrays are based is that of specific recognition, by probe molecules affixed to the array, of target molecules, whether by sequence-mediated binding affinities, binding affinities based on conformational or topological properties of probe and target molecules, or binding affinities based on spatial distribution of electrical charge on the surfaces of target and probe molecules.

Although currently commonly used and widely commercially available, the plastic microarray packaging shown in FIG. 1 has a number of disadvantages. First, it is necessary to seal the substrate of the microarray within the plastic housing to prevent exchange of liquids and vapors between the external environment and the reaction chamber formed by the substrate of the microarray, the plastic housing, and a bottom cover. Microarray substrates are commonly made from glass. Thus, a tight seal between the glass microarray substrate and the plastic housing is required. Unfortunately, many sealants used to seal glass to plastic may contain unreactive monomer or produce reactive surfaces that interfere chemically within the hybridization processes that need to be carried out within the reaction vessel. A second disadvantage is that glass and plastic exhibit different thermal expansion behaviors, creating high stress that may lead to glass-to-plastic bond failures during exposure of the plastic microarray packaging and embedded microarray to thermal fluctuations. A third disadvantage of the plastic packaging shown in FIG. 1 is that the plastic packaging is generally insufficiently mechanically stable to allow for reliable automated positioning of the microarray within a scanning device. As a result, scanning devices need an auto-focusing feature or other additional electromechanical systems for positioning the microarray within the scanning device. A fourth disadvantage of the plastic packaging shown in FIG. 1 is that, when the embedded microarray is scanned without removing the microarray from the plastic packaging, the thickness of the microarray substrate or of the lower transparent cover, depending from which side of the package the microarray is scanned, must have a relatively precise and uniform thickness so that the microarray substrate or bottom cover is not a source of uncontrolled error during the scanning process. Manufacturing either the microarray substrate or bottom cover to the required precision and uniformity adds to the cost of the microarray/plastic housing module. In general, fully automated manufacture of the plastic housing and embedded microarray is both complex and difficult. A final disadvantage of the plastic packaging for the microarray shown in FIG. 1 is that the microarray/plastic housing module is primarily designed for individual handling, and lacks features that would facilitate automated positioning, hybridization, and scanning of the microarray/plastic housing modules. Thus, designers, manufacturers, and users of microarrays have recognized the need for a more economical packaging method and system for microarrays with features that facilitate automated processing and handling of microarrays.

SUMMARY OF THE INVENTION

One embodiment of the present invention is a linear pocket strip comprising a series of pockets, or cells, into each pocket of which a microarray can be positioned. The pockets, and microarrays contained within the pockets, are covered by a cover strip that can be heat sealed to the first plastic strip so that each microarray is positioned within a tightly sealed reaction chamber formed by bonding the cover strip to the pocket strip, the resulting linear series of reaction chambers called a "microarray strip." Membrane septa can be affixed to, or embedded within, the cover strip to provide resealable ports through which sample solutions or gasses can be introduced into each reaction chamber. The microarray strip may include one or more linear sequences of regularly-spaced tractor feed perforations, or other features that can be automatically sensed, to allow for precise mechanical translation and positioning of the embedded microarrays within a mechanical device. Thus, following heat sealing, the pocket and cover strips, and microarrays embedded within sealed reaction chambers formed by the pocket and cover strips, provide a regularly-spaced sequence of packaged microarrays that together compose a microarray strip. The linear sequence of packaged microarrays can be fed through various automated systems for processing and scanning, and can be rolled onto reels for storage and shipment. In an alternate embodiment, the microarrays are deposited directly onto the cover strip, eliminating the need for separate microarray substrates. In additional embodiments, two-dimensional microarray sheets may be created by a process similar to that for creating microarray strips.

DETAILED DESCRIPTION OF THE INVENTION

One embodiment of the present invention is a linear sequence of regularly-spaced, tightly sealed microreaction chambers that each contains a precisely positioned and oriented microarray, called a "microarray strip." The microarray strip further includes tractor feed perforations or other regularly spaced mechanical or optical features that allow the microarray strip, and the microarray contained within the microarray strip, to be mechanically translated and precisely positioned within various automated electromechanical systems. A microarray strip may also serve as a sequence of economical and reliable storage chambers and as packaging for storing, handling, and transporting microarrays contained within the microarray strip. The microarray strip may be rolled onto reels for compact and reliable storage of microarrays.

Note that a microarray strip may have a length to width ratio of at least 5/1, 10/1, 50/1, 200/1, 500/1, or even at least 1000/1. Microarray strips may have many different dimensions, for example, at least 100 cm, 200 cm, 500 cm, or even at least 1, 5, or 10 meters.

Figure 1:
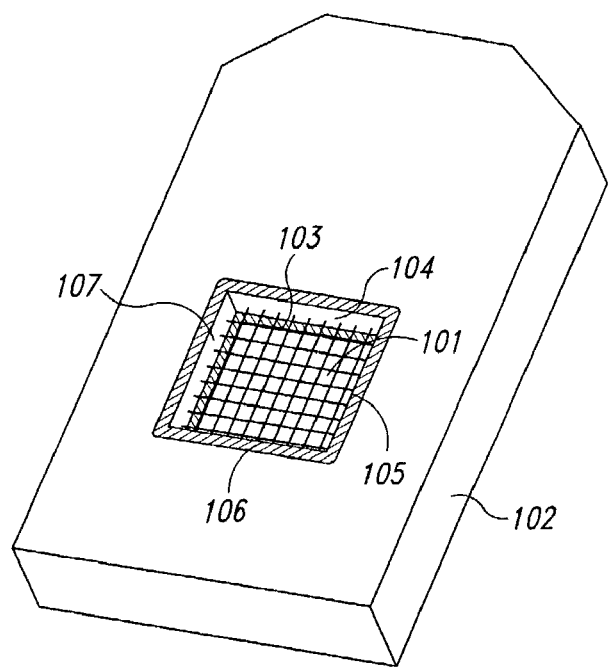
FIG. 1 shows a common, currently available commercial microarray packaged within a plastic housing.
Figure 2:
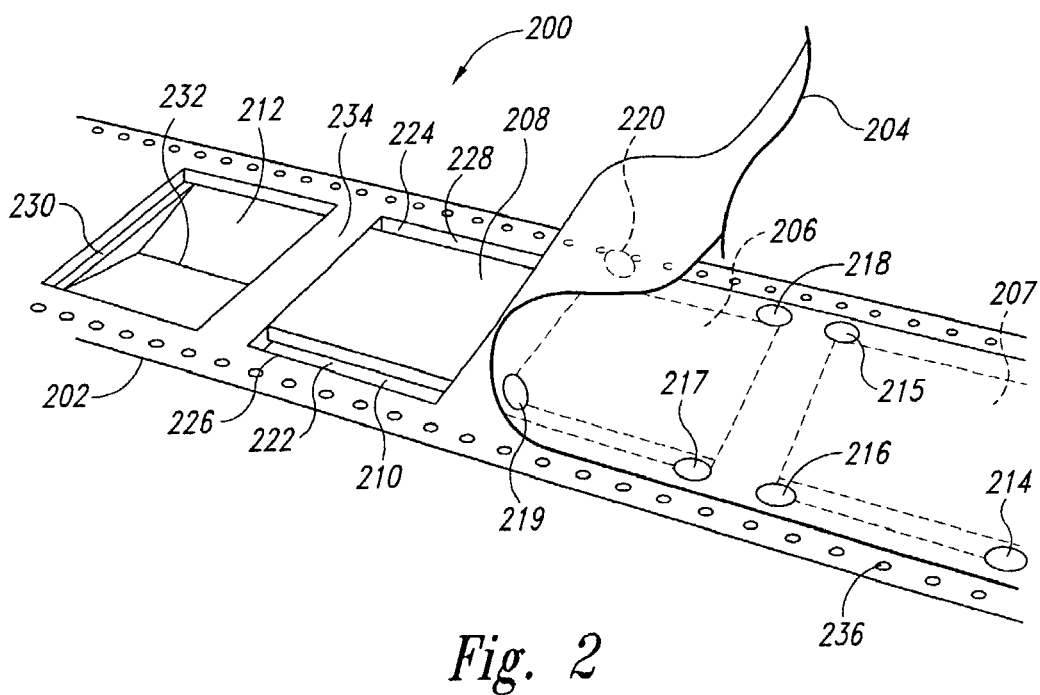
FIG. 2 shows a microarray strip.

FIG. 2 shows a microarray strip that represents one embodiment of the present invention. The microarray strip 200 comprises a pocket strip 202 and cover strip 204. The microarray strip 200 in FIG. 2 is shown during manufacture as the cover strip 204 is being laid down along the top surface of the pocket strip 202 to create sealed reaction chambers 206–207. A microarray 208 has been inserted into a pocket 210 of the pocket strip 202 which will be next covered by the cover strip 204 during the manufacturing process. An additional empty pocket 212, into which a next microarray will be placed, is located to the left of pocket 210 containing microarray 208. Membrane septa 214–220 are affixed to the cover strip 204 over corner regions of the sealed reaction chambers 206 and 207 to provide resealable ports through which solutions can be introduced into, and extracted from, the sealed reaction chambers. The septa are positioned above two elongated wells 222 and 224 formed by gaps between edges of an embedded microarray 208 and the sides of a pocket 226 and 228. Note that each microarray is positioned to rest on two ledges 230 (second ledge obscured in FIG. 2) to leave a gap between the microarray and the bottom 232 of the pocket in which the microarray is placed. The two linear wells 222 and 224 and the gap between the bottom active surface of the microarray and the bottom of the pocket 232 form a single continuous volume within the pocket. The ledges 230 may be designed so that the top surface of the microarray is flush with the upper surface of the pocket strip 234 or, alternatively, may be designed so that the upper surface of the microarray is recessed within each pocket to leave a gap between the upper surface of the microarray and the cover strip 204 following heat sealing of the cover strip 204 to the pocket strip 202. Generally, the active surface of the embedded microarrays, to which features are bonded, is positioned downward, and is opposite from the side of the microarray adjacent to the cover strip in the sealed reaction chambers. Both edges of the pocket strip contain a linear, regularly-spaced sequence of tractor feed perforations such as tractor perforation 236. These perforations can be enmeshed with gear-like feed rollers of various different mechanical systems to allow for automated translation of the microarray strip in a direction parallel to the length of the microarray strip and can also provide for precise mechanical positioning of the embedded microarrays within a scanning device.

Many alternative embodiments of the microarray strip can be designed and manufactured, and many different types of materials may be employed. In one embodiment, for example, the pocket strip and cover strip may be made from acrylonytrile-butodiene-styrene ("ABS") plastic and can be continuously manufactured via a vacuform process. The ABS pocket strip and cover strip can be readily heat sealed to provide a reasonably liquid-and-vapor-impermeable barrier. Alternatively, the cover strip may be sealed to the pocket strip via an adhesive sealant or may be designed to allow for mechanical sealing by application of mechanical pressure. Alternatively, both the pocket strip and cover strip may be manufactured from a plastic/metal foil laminate or other materials that provide a more robust barrier to exchange of liquid and vapor between the sealed reaction chambers and the outside environment. The septa can be affixed either to the upper surface or to the lower surface of the cover strip and can be manufactured from many different types of materials. In one embodiment, the septa are three-ply laminates comprising an interior elastomer layer sandwiched between two polyester layers. While the active surface of a microarray is normally the lower surface, in alternative embodiments, the microarray may be positioned so that the active surface faces upward and is adjacent to the cover strip. In one embodiment, the cover strip is removed prior to scanning the microarrays, but in alternate embodiments, the microarray may be scanned through the cover strip 204 while remaining embedded within a reaction chamber. While the embodiment shown in FIG. 2 employs tractor feed perforations on both edges of the pocket strip for precise mechanical translation and positioning, many other types of positioning features may be used, including printed or molded features that can be optically scanned, dimples or bumps that can be mechanically sensed, rectangular, regularly-spaced indentations that together form a rack of a familiar rack and pinion mechanism, or another type of feature that can be mechanically, optically, electrically sensed to aid in automatic translation and positioning.

Figure 3:
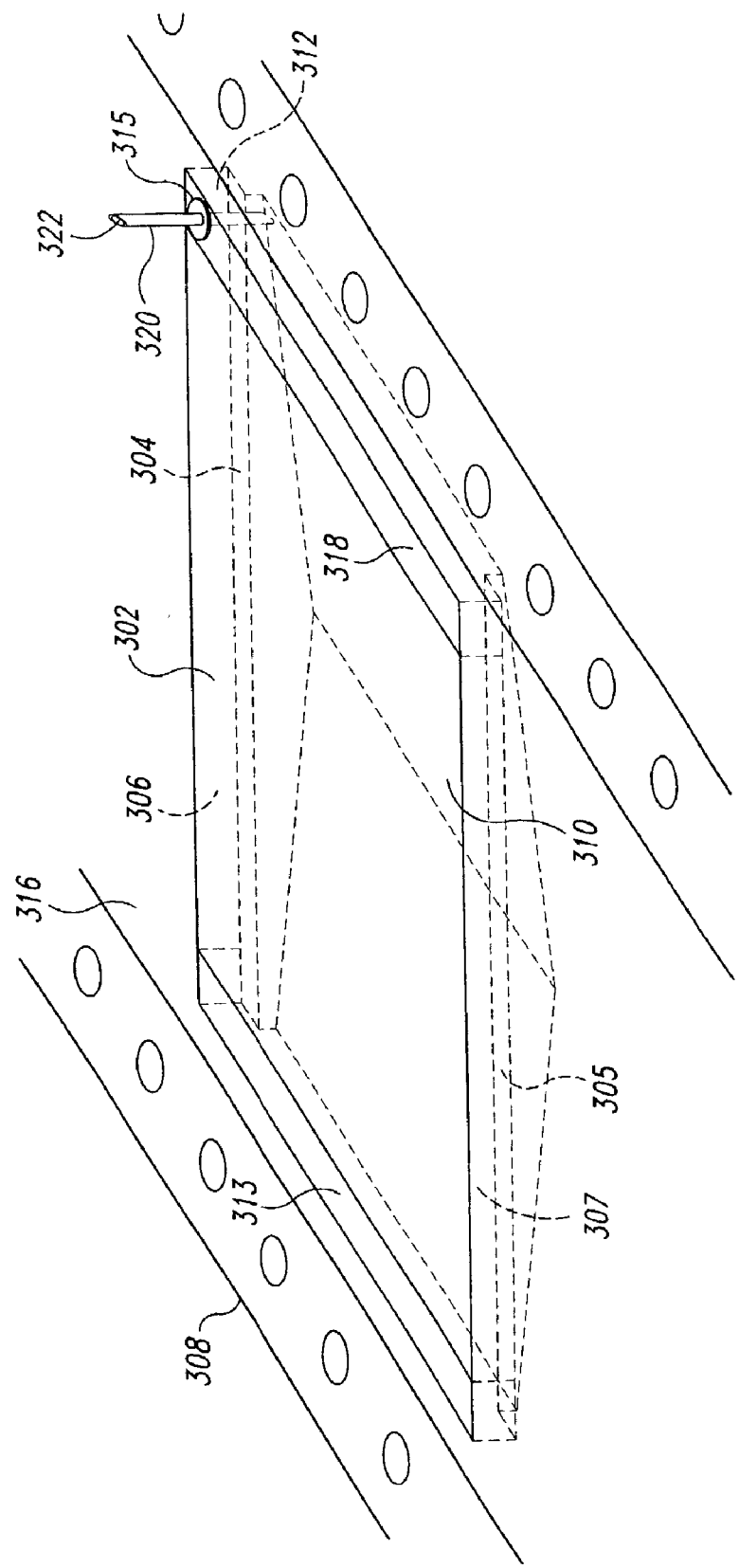
FIG. 3 shows a pocket within a pocket strip in which a microarray has been positioned.

FIG. 3 shows a pocket within the pocket strip in which a microarray has been positioned. The microarray 302 rests on two ledges 304–305 formed in the sides 306–307 of the pocket perpendicular to the edge 308 of the pocket strip. The bottom surface of the pocket 310 and the sides of the pocket 306–307 and 312–313 form a well below and adjacent to the sides of the microarray parallel to the edge of the pocket strip 308. Sample solutions can be introduced into this well and drawn under the microarray via capillary action, and can be extracted from the well and replaced with additional sample solutions or preservative solutions following a series of hybridization steps. A septum 315 affixed to the cover strip 316 is positioned above the well adjacent to the right-hand side of the microarray substrate 318. A pipette tube 320 is shown inserted through the septum 315 and cover strip 316 in order to provide a small passage 322 from the external environment into the well adjacent to the right-hand side 318 of the microarray substrate. Solutions can be introduced into, and extracted from, the well adjacent to and below the microarray substrate via the pipette tube.

Figure 4A:
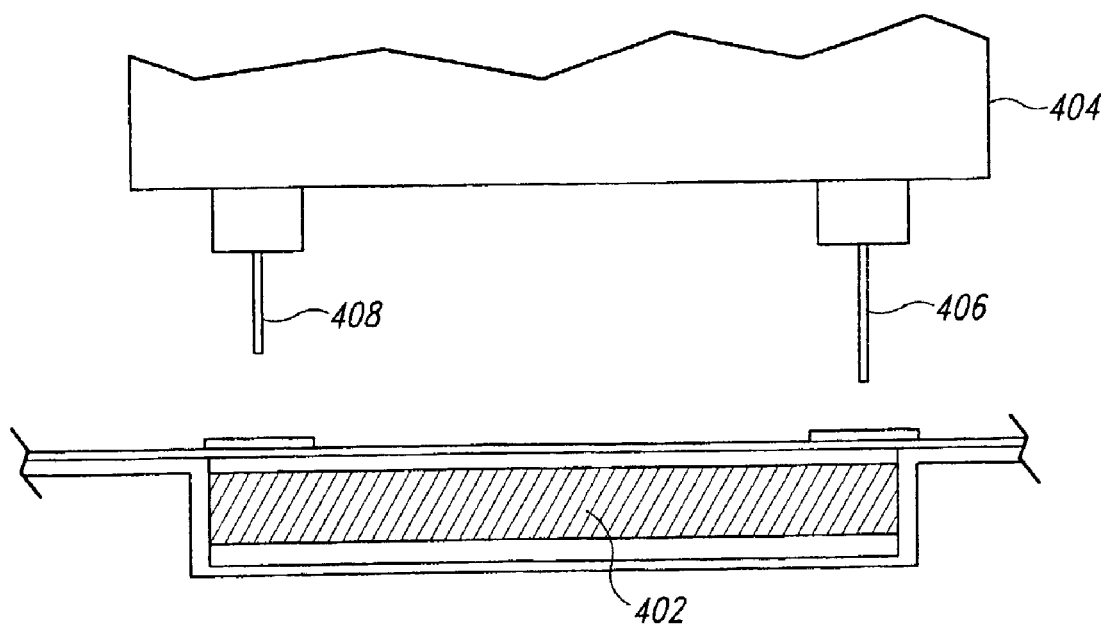
FIGS. 4A–4B illustrate automated introduction of a sample solution into a sealed reaction chamber of a microarray strip.
Figure 4B:
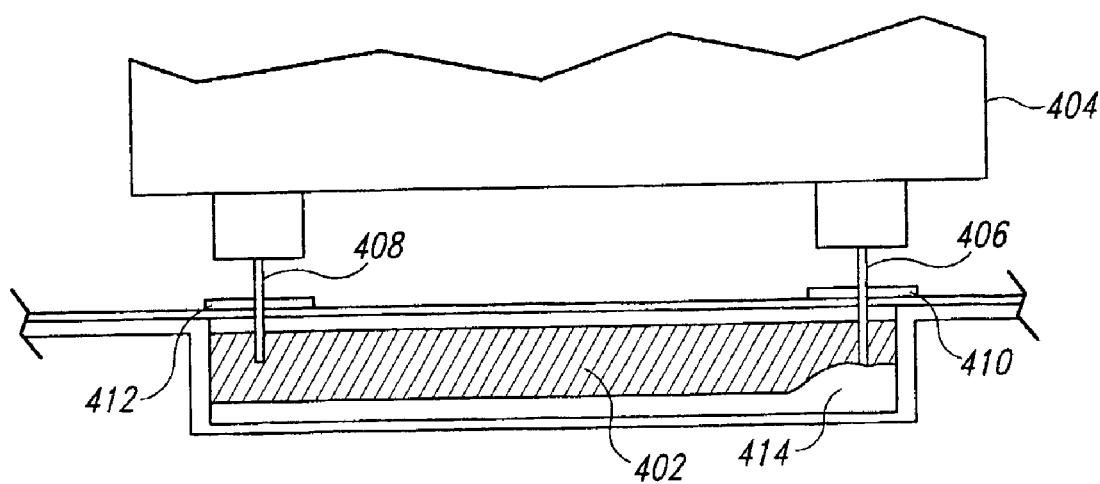

FIGS. 4A–4B illustrate automated introduction of a sample solution into a sealed reaction chamber of a microarray strip. In FIG. 4A, a reaction chamber 402 of a microarray strip is shown, in cross-section, positioned below a sample-introducing machine 404 that includes a pipette tube 406 and a vent tube 408. In FIG. 4B, the sample-introducing machine 404 has been lowered toward the reaction chamber 402 so that the pipette tube 406 and the vent tube 408 have been inserted through septa 410 and 412, respectively. The sample-introducing machine 404 introduces a sample solution 414 into the well adjacent to the side of the microarray substrate while displaced solution or air is drawn out from the reaction chamber via the vent tube 408. The sample-introducing machine 404 may continuously move between sample vessels or microtitre plates and reaction chambers of microarray strips in order to iteratively introduce sample solutions into, and remove sample solutions from, a sequence of reaction vessels in a fully automated process. Thus, the microarray strip facilitates full automation of microarray hybridization processes, and other processes that involve exchange of fluids and gasses with the interior of the reaction vessels. Moreover, the multiple microarrays in microarray strips may be automatically processed, following hybridization or other chemical modification, for analysis or diagnostic purposes, by large, multi-stage processing machines, such as automated hospital diagnostic systems. Alternatively, individual microarrays may be separated from a microarray strip for individual processing.

As noted above, the cover strip (204 in FIG. 2) can be removed and microarrays can be extracted from their reaction chambers via automated processes. Alternatively, the cover strip may be removed from the pocket strip and the microarrays scanned or otherwise processed while remaining within pockets of the microarray strip. In yet another embodiment, the microarrays may be scanned and otherwise processed without removing the cover strip, requiring that the thickness and transparency of the cover slip be sufficiently uniform to avoid scanning errors. To facilitate automated removal of microarrays from the microarray strip, features may be molded within the pocket strip to provide clearance for grip points to facilitate automated removal of microarrays from the microarray strip. In yet another embodiment, the reaction chambers may be designed to be removed, one-by-one, from the microarray strip and handled separately. In this embodiment, perforations may be molded or pressed into the pocket strip vertical to the edge of the pocket strip between the reaction chambers to allow the pocket strips to be easily removed from the microarray strip.

Figure 5:
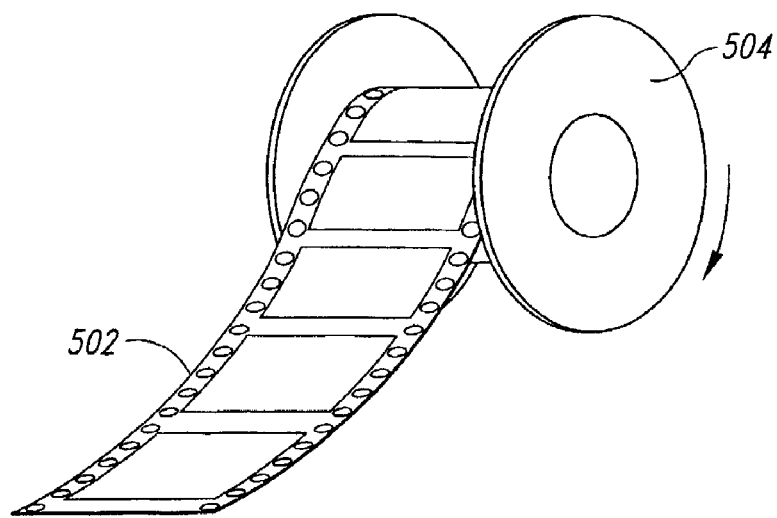
FIG. 5 illustrates rolling of a microarray strip onto a reel.

The microarray strip may be rolled onto a reel or reel for storage and transport. FIG. 5 illustrates rolling of a microarray strip onto a reel. In FIG. 5, a microarray strip 502 is shown in the process of being rolled onto a reel 504. Rolling a microarray strip onto a reel provides greater protection of the microchips embedded within the microarray strip from exposure to mechanical or environmental damage. In addition, reels of microarray strips may be easily inserted into automatic systems that can automatically unwind the reels as the microarray strip is fed into the automated systems for processing.

Figure 6:
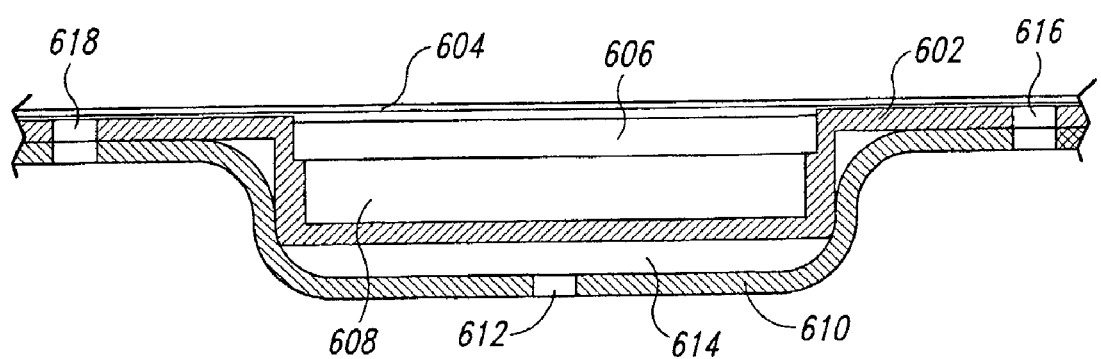
FIG. 6 shows a cross section of a microarray-strip reaction chamber packaged in a second pocket strip.

The microarray strip may be further packaged within a second pocket strip to further protect the reaction chambers from damage and environmental insults. FIG. 6 shows a cross section of a microarray-strip reaction chamber packaged in a second pocket strip. In FIG. 6, a first pocket strip 602, a cover strip 604, and a microarray 606 together form a reaction chamber 608, as described above. The reaction chamber 608 is then packaged within a second pocket tape 610, which further protects the reaction chamber from damage. The second pocket tape includes a vent hole 612 to allow air to escape during insertion of the reaction chamber 608 into the pocket 614 of the second pocket tape. Perforation holes 616 and 618 passing through both the first and second pocket tapes allow the first and second pocket tapes to be aligned and affixed to one another. Additional extra packaging may also be employed to further protect the reaction chambers within a microarray strip.

Figure 7:
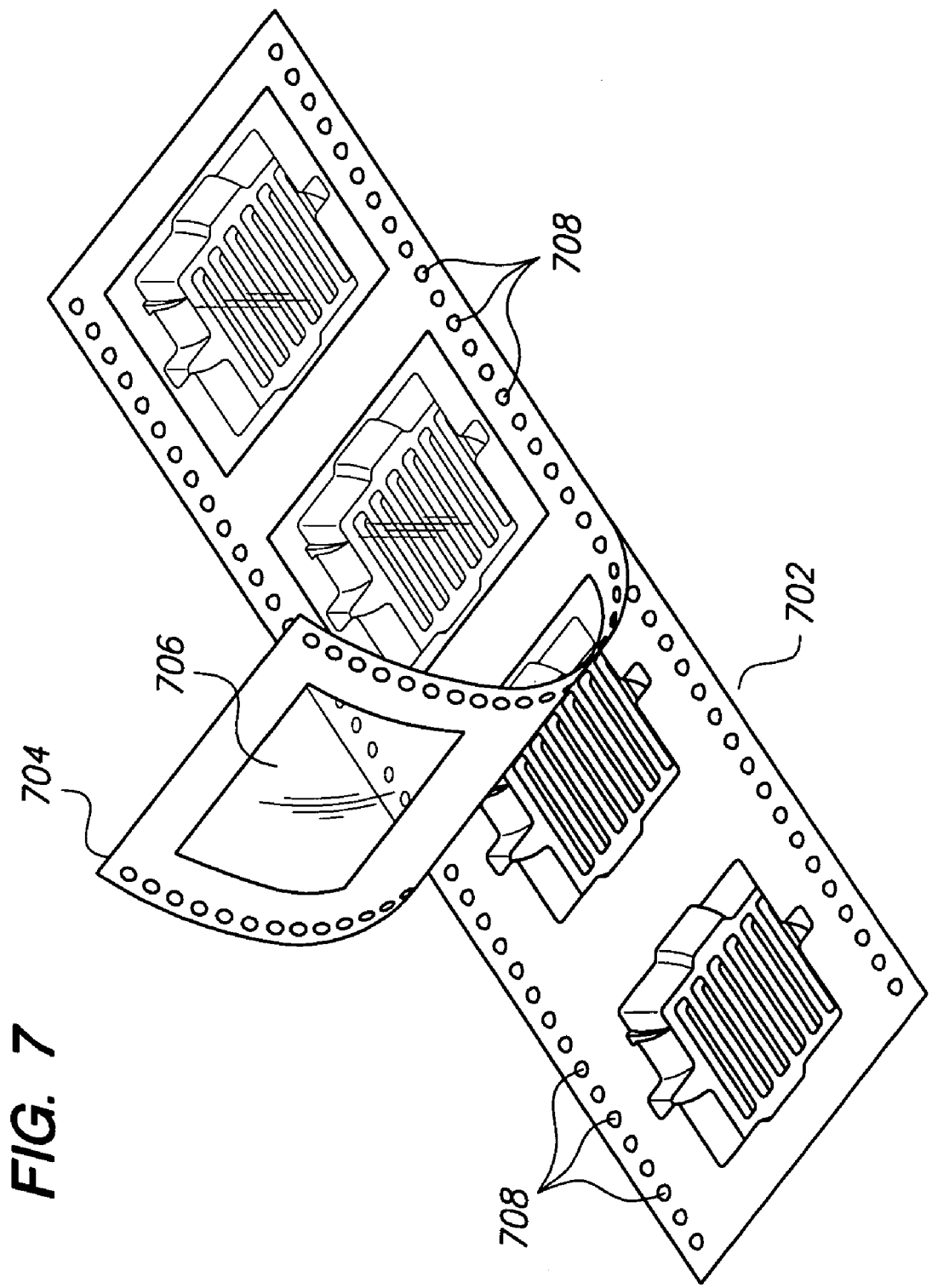
FIG. 7 shows an alternative embodiment of the microarray strip.

FIG. 7 shows an alternative embodiment of the microarray strip. As shown in FIG. 7, the alternate embodiment employs a pocket strip 702 and a cover strip 704, as in the case of the first embodiment, described above with reference to FIG. 2. However, in the alternative embodiment, there is no separate microarray substrate that is inserted into the pockets and enclosed within the reaction chambers upon sealing the cover strip to the pocket strip. Instead, the cover strip itself serves as the substrate for a continuous series of microarrays. Thus, as shown in FIG. 7, a grid or other pattern of features comprising probe molecules 706 is deposited directly onto the inner surface of the cover strip. In the second, alternative embodiment, microarrays can be manufactured in a continuous, linear strip, or in a two-dimensional sheet, on a cover strip or cover sheet and can then be affixed to a linear pocket strip or a two-dimensional sheet of pocket strips to produce a complete strip or sheet of reaction chambers enclosing microarrays. In the second, alternative embodiment, any number of different types of flexible cover strips amenable to deposition of microarray features can be used, including laminate films with alumina layers, sputtered glass layers, glass films, or other such materials. The inner surface of the flexible cover strip can be chemically coated, such as by chemically coating with silane, or otherwise modified to provide a sound, chemical foundation for binding probe molecules or onto which probe molecules may be synthesized in a set of successive steps. In addition, the pocket strip and flexible cover strip may contain additional, molded or imprinted patterns or shapes that facilitate orientation and in-register alignment of the microarrays, deposited on the flexible cover strips, with the pocket openings. In the embodiment shown, pocket strip 702 in combination with flexible cover strip 704 comprise regularly spaced features 708, which may be an optical feature or other feature that can be detected by sensors to direct an electromechanical translating and positioning mechanism to translate and position the microarray sheet. As in the initially described embodiment, the cover strip may additionally contain openings for septa or other features to facilitate introduction and extraction of reaction fluids from the enclosed reaction chambers. In certain embodiments, the cover strip may be transparent, to facilitate reading or scanning of the microarrays without removing the cover strip, while, in other embodiments, the cover strip may be opaque or translucent, requiring removal of the cover strip in order to expose the active surfaces of the microarrays for reading or scanning. The cover strip may also be imprinted with bar codes or other identification and informational markings or messages to facilitate automated processing and data extraction.

Note that the term "flexible" refers to the fact that the relatively planar, flexible cover strip may be repeatedly bent into a cylindrical section, without regard to an absolute orientation, without breaking, tearing, puncturing, or otherwise deforming the flexible cover strip. As discussed above, many different types of materials may be used for the cover strip and pocket trip, including plastics, foils, laminates, rubber and rubber-like materials, and other such materials. The material is chosen for ease of forming and molding, mechanical strength, and for impermeability to reaction solutions used to prepare, expose, wash, and otherwise act upon the molecular array. Plastics are generally synthetic polymers of relatively high molecular weight.

Although the present invention has been described in terms of a particular embodiment, it is not intended that the invention be limited to this embodiment. Modifications within the spirit of the invention will be apparent to those skilled in the art. For example, the individual reaction chambers can be labeled with optical or imprinted labels, such as bar codes or digitized numbers, for automated identification of individual microarrays embedded within the reaction chambers. The described embodiment is a single linear strip of reaction chambers containing embedded microarrays, but alternative embodiments may include microarray sheets with multiple linear, side-by-side rows of reaction chambers, or other two-dimensional arrangement of reaction chambers within the microarray sheet. As discussed above, an almost limitless number of different types of features that facilitate mechanical translation and positioning may be employed, including the described tractor feed perforations as well as other types of regularly-spaced mechanical features or regularly-spaced optical or electromagnetic features that can be automatically sensed by sensing elements within an automated system. In the described embodiment, no particular ordering or arrangement of microarrays within a microarray strip is described. However, the microarray strip may be considered as an extended microarray comprising a large number of smaller, individual microarrays ordered within the microarray strip. Although, in the described embodiment, each pocket contains a single microarray, in alternate embodiments, pockets may each contain more than one microarray. Many different types of materials can be employed for manufacturing the pocket strip and cover strip, and reaction vessels of almost any size, shape, and volume can be fabricated. The cover strip, in the described embodiment, is transparent and the pocket strip is opaque, but, in alternate embodiments, either or both of the cover strip and pocket strip may be transparent, translucent, or opaque. Because the pocket strip and cover strip can by manufactured by continuous processes, and because microarray strips can be created from pocket strips, microarrays, septa, and cover strips by automated, continuous processes, microarray strips of arbitrary lengths can be manufactured. As discussed above, the microarray package and reaction chambers may be manufactured discretely, and later coupled into linear strips or two-dimensional sheets, or may be initially manufactured as continuous strips or continuous two-dimensional sheets. The continuous strips or sheets may be further rolled or stacked into compact three-dimensional volumes for shipping and storage. In the second, alternative embodiment, microarrays of many different sizes and with many different grid patterns may be deposited onto the inner surfaces of cover strips. Both the pocket strip and cover strip materials may be varied depending on the types of reactants and reaction fluids needed to be contained within the reaction chambers.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A microarray package and reaction chamber comprising:
    a well-shaped pocket having a top edge; and
    a flexible cover, onto which a microarray has been deposited on an inner surface thereof, wherein the inner surface of the flexible cover is bonded to the top edge of the pocket and is lying in a plane flush with the top edge of the pocket to create an enclosed reaction chamber containing the microarray; and one or more septa affixed to the flexible cover, providing resealable ports through which solutions and gasses can be introduced into the reaction chamber and through which solutions and gasses can be extracted from the reaction chamber.

2. The microarray package and reaction chamber of claim 1 wherein one or both of the pocket and flexible cover are made from one of:
    plastic;
    a polymer/metal foil laminate; and
    a metal foil.

3. The microarray package and reaction chamber of claim 1 wherein the flexible cover is chemically treated to facilitate binding or synthesis of probe molecules that comprise features of the microarray.

4. The microarray package and reaction chamber of claim 1 wherein the flexible cover is bonded to the pocket by one of:
    an adhesive sealant;
    heat sealing; and
    mechanical force applied to complementary molded features of the pocket and flexible cover.

5. The microarray package and reaction chamber of claim 1 wherein the flexible cover bonded to the top edge of the well-shaped pocket to form the enclosed reaction chamber prevents exchange of liquid and vapor phase substances between the interior of the reaction chamber and an external environment.

6. A number of microarray packages and reaction chambers forming a microarray strip, the number of microarray packages and reaction chambers comprising:
    a pocket strip comprising an upper surface and a number of well-shaped pockets extending below the upper surface; and
    a flexible cover strip, onto which a number of microarrays have been deposited on an inner surface thereof, wherein the inner surface of the flexible cover strip is bonded to the upper surface of the pocket strip and is lying in a plane flush with the upper surface of the pocket strip to create a number of enclosed reaction chambers, each containing a microarray wherein each reaction chamber includes one or more septa affixed to the flexible cover strip, providing resealable ports through which solutions and gasses can be introduced into the reaction chambers and through which solutions and gasses can be extracted from the reaction chambers.

7. The number of microarray packages and reaction chambers forming a microarray strip of claim 6 wherein one or both of the pocket strip and flexible cover strip are made from one of:
    plastic;

a polymer/metal foil laminate; and a metal foil.

8. The number of microarray packages and reaction chambers forming a microarray strip of claim 6 wherein the flexible cover strip is chemically treated to facilitate binding or synthesis of probe molecules that comprise features of the microarray.

9. The number of microarray packages and reaction chambers forming a microarray strip of claim 6 wherein the flexible cover strip is bonded to the pocket by one of:

an adhesive sealant;

heat sealing; and mechanical force applied to complementary molded features of the pocket and cover.

10. The number of microarray packages and reaction chambers forming a microarray strip of claim 6 wherein the flexible cover strip bonded to the upper surface of the pocket strip to form the enclosed reaction chamber prevents exchange of liquid and vapor phase substances between the interiors of the reaction chambers and an external environment.

11. The number of microarray packages and reaction chambers forming a microarray strip of claim 6 further including regularly spaced features that facilitate automatic translation and positioning of the microarray strip.

12. The number of microarray packages and reaction chambers forming a microarray strip of claim 11 wherein the regularly spaced features comprise two sets of tractor feed perforations along each edge of the microarray strip.

13. The number of microarray packages and reaction chambers forming a microarray strip of claim 11 wherein the regularly spaced features comprise regularly spaced optical features that can be detected by optical scanning.

14. The number of microarray packages and reaction chambers forming a microarray strip of claim 11 wherein the regularly spaced features comprise regularly spaced features that engage with complementary features of a mechanical translation and positioning mechanism.

15. The number of microarray packages and reaction chambers forming a microarray strip of claim 11 wherein the regularly spaced features comprise regularly spaced features that can be detected by sensors to direct an electromechanical translating and positioning mechanism to translate and position the microarray strip.

16. A number of microarray packages and reaction chambers forming a two-dimensional microarray sheet, the number of microarray packages and reaction chambers comprising:

a flexible pocket sheet comprising an upper surface and a number of well-shaped pockets extending below the upper surface; and a flexible cover sheet, onto which a number of microarrays have been deposited on an inner surface thereof, wherein the inner surface of the flexible cover sheet is bonded to the upper surface of the pocket sheet and is lying in a plane flush with the upper surface of the pocket sheet to create a number of enclosed reaction chambers, each containing a microarray wherein each reaction chamber includes one or more septa affixed to the flexible cover sheet, providing resealable ports through which solutions and gasses can be introduced into the reaction chambers and through which solutions and gasses can be extracted from the reaction chambers.

17. The number of microarray packages and reaction chambers forming a two-dimensional microarray sheet of claim 16 wherein one or both of the flexible pocket sheet and flexible cover sheet are made from one of:

plastic;

a polymer/metal foil laminate; and a metal foil.

18. The number of microarray packages and reaction chambers forming a two-dimensional microarray sheet of claim 16 wherein the flexible cover sheet is chemically treated to facilitate binding or synthesis of probe molecules that comprise features of the microarray.

19. The microarray package and reaction chamber of claim 16 wherein the flexible cover sheet is bonded to the flexible pocket sheet by one of:

an adhesive sealant;

heat sealing; and mechanical force applied to complementary molded features of the flexible pocket sheet and flexible cover sheet.

20. The number of microarray packages and reaction chambers forming a two-dimensional microarray sheet of claim 16 wherein the flexible cover sheet is chemically treated to facilitate binding or synthesis of probe molecules that comprise features of the number of microarrays.

21. The number of microarray packages and reaction chambers forming a two-dimensional microarray sheet of claim 16 wherein the flexible cover sheet bonded to the upper surface of the pocket sheet to form the enclosed reaction chambers prevents exchange of liquid and vapor phase substances between the interiors of the reaction chambers and an external environment.

22. The number of microarray packages and reaction chambers forming a two-dimensional microarray sheet of claim 16 further including regularly spaced features that facilitate automatic translation and positioning of the microarray sheet.

23. The number of microarray packages and reaction chambers forming a two-dimensional microarray sheet of claim 22 wherein the regularly spaced features comprise two sets of tractor feed perforations along edges of the microarray sheet.

24. The number of microarray packages and reaction chambers forming a two-dimensional microarray sheet of claim 22 wherein the regularly spaced features comprise regularly spaced optical features that can be detected by optical scanning.

25. The number of microarray packages and reaction chambers forming a two-dimensional microarray sheet of claim 22 wherein the regularly spaced features comprise regularly spaced features that engage with complementary features of a mechanical translation and positioning mechanism.

26. The number of microarray packages and reaction chambers forming a two-dimensional microarray sheet of claim 22 wherein the regularly spaced features comprise regularly spaced features that can be detected by sensors to direct an electromechanical translating and positioning mechanism to translate and position the microarray sheet.

27. A method for packaging a microarray, the method comprising:

providing a well-shaped pocket comprising a top edge;

providing a flexible cover;

creating features of a microarray on an inner surface of the cover to create a microarray on the inner surface; and bonding the inner surface of the cover onto the top edge of the pocket to seal the microarray within the pocket, thereby creating a package and reaction chamber with the cover lying in a plane flush with the top edge of the pocket.

28. The method of claim 27 further including affixing one or more septa to the cover, providing resealable ports through which solutions and gasses can be introduced into the reaction chamber and through which solutions and gasses can be extracted from the reaction chamber.

29. A method for packaging a number of microarrays, the method comprising:
   providing a pocket strip comprising a number of well-shaped pockets;
   providing a flexible cover strip;
   creating features of the number of microarrays on an inner surface of the flexible cover strip to create a number of microarrays on the inner surface; and
   bonding the inner surface of the flexible cover strip onto the pocket strip to seal the number of microarrays within the number of pockets, thereby creating a number of packages and reaction chambers, each containing a microarray.

30. A method for packaging a number of microarrays into a two-dimensional array sheet, the method comprising:
   providing a flexible pocket sheet comprising a number of well-shaped pockets;
   providing a flexible cover sheet;
   creating features of the number of microarrays on an inner surface of the flexible cover sheet to create a number of microarrays on the inner surface; and
   bonding the inner surface of the flexible cover sheet onto the flexible pocket sheet to seal the number of microarrays within the number of pockets, thereby creating a number of packages and reaction chambers, each containing a microarray.

31. The number of microarray packages and reaction chambers forming a microarray strip of claim 6 wherein the pocket strip is flexible.

32. The number of microarray packages and reaction chambers forming a two-dimensional microarray sheet of claim 16 present on a reel.

* * * * *